United States Patent [19]

Kuhlmann

[11] 4,390,311

[45] Jun. 28, 1983

[54] TOOL SUPPORT FOR TOOL MACHINES

[75] Inventor: Gerhard Kuhlmann, Stuttgart, Fed. Rep. of Germany

[73] Assignee: Robert Bosch GmbH, Stuttgart, Fed. Rep. of Germany

[21] Appl. No.: 199,108

[22] Filed: Oct. 20, 1980

[30] Foreign Application Priority Data

Oct. 27, 1979 [DE] Fed. Rep. of Germany ....... 2943501

[51] Int. Cl.3 ................................................ B23B 5/22

[52] U.S. Cl. ................................ 409/232; 279/1 ME; 279/8; 408/239 R

[58] Field of Search ............... 409/230, 231, 232, 233, 409/234; 408/239, 239 A; 279/1 E, 1 ME, 4, 19.1, 19.2, 33, 1 TS, 8

[56] References Cited

U.S. PATENT DOCUMENTS 3,161,242 12/1964 Etzkorn et al. ................ 279/19.1 X
3,454,284 7/1969 Moores, Jr. ........................ 279/19.1
3,804,426 4/1974 Mickas ............................... 409/233
4,176,991 12/1979 Egli ................................ 408/239 R

*Primary Examiner*—Z. R. Bilinsky
*Attorney, Agent, or Firm*—Michael J. Striker

[57] ABSTRACT

A tool support for a hand tool machine includes a housing surrounding a drive spindle having a recess to receive a tool-receiving sleeve. This recess accommodates a compression spring which biases an end portion of the sleeve. The sleeve is also provided with a tool-facing portion receiving a tool to be used and an intermediate shaped portion which is arranged for a possible slidable movement within an adapter rigidly mounted to the drive spindle. A second sleeve is provided in the tool support which is threadably mounted on the tool-facing portion of the tool-receiving sleeve and is arranged so that its axial position may be adjusted. Said end portion of the sleeve has such a length that the length of contact of this end portion with the recess should be relatively larger than the combined length of contact of the shaped portion of the tool-receiving sleeve with the inner surface of the adapter and a possible path of the second sleeve in the axial direction. Such a structure provides a quick change of a tool to be used without any potential danger to an operator.

9 Claims, 3 Drawing Figures

TOOL SUPPORT FOR TOOL MACHINES

BACKGROUND OF THE INVENTION

The invention relates to tool supports for tool machines particularly for hand tool machines.

It is known in the art that a tool drive operatively connected to a tool is switched on and off independently on contact of the tool with a workpiece. The locking-in connection between a drive and a tool is steadily maintained by a tool drive. When shut-down of the tool takes place the drive lags in the rotational movement from the tool and the whole energy of the moving masses in this lagging phase is applied to a tool. This may result in potential danger to an operator. Furthermore, this lagging effect obstructs the change of the tool unless the complete stopping of the tool is attained. The change of a tool during continuous tool driving is completely excluded since it is dangerous for an operator. It is therefore desirable to prevent the potential danger to an operator working with hand-operated tool machines.

SUMMARY OF THE INVENTION

It is an object of the invention to provide an improved tool support for a hand tool machine.

Another object of the invention is to provide an improved tool support which prevents an operator from a potential danger when a tool to be used is changed in case the tool machine is not completely shut down.

Still another object of the invention is to provide relatively quick change of a tool to be utilized.

These and other objects of the invention are attained by a tool support for a tool machine having a tool drive and transmission means adapted to operate under working pressures acting in a direction of an axis of rotation, where the combination comprises a housing, a drive spindle having an end connected to the tool drive and a longitudinal axis recess, an inner tool-receiving sleeve having a first end portion received in said recess, an intermediate shaped portion connected to said first end portion for rotation therewith, and a second end portion adapted to receive a tool, biasing means located within said recess and adapted to bias said first end portion, an outer sleeve mounted on said second end portion and adapted for movement in said axial direction so that its position may be adjusted relatively to said spindle, and mounting means connected to said spindle and having an inner shaped surface corresponding to the surface of said shaped portion and adapted to receive said shaped portion for axial movement therethrough. The first end portion of the inner sleeve has in accordance with the invention, such a length that the length of coupling engagement between the first end portion and said spindle should be relatively larger than the combined length of contact of the shaped portion with the inner shaped surface of the mounting means and a possible path of the outer sleeve in said axial direction.

The tool support may further comprise locking means mounted on said housing and adapted to be selectively positioned in a locking position where said locking means limit said movement of said outer sleeve or in a releasing position on said housing.

The biasing means may be a compression spring.

The mounting means may include an adapter rigidly connected to said spindle and a nut positioned within said adapter, said nut being provided with said inner shaped surface.

The compression spring may be prestressed to bias said first end portion towards a tool to be used.

The outer sleeve may extend in an axial direction towards said end of said drive spindle and adapted for overlapping an open portion of said spindle to thereby prevent the latter from pollution.

The adapter may be threadedly mounted on the spindle.

The second portion of said inner sleeve may have an outer thread and said outer sleeve has an inner thread so that said outer sleeve is threadably positioned on said second portion, said outer thread being relatively longer than said inner thread to thereby permit the adjustment of the length of contact of said shaped shaft portion with said inner shaped surface.

The second end portion is formed with a recess to receive a tool to be used.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENT

Figure 1:
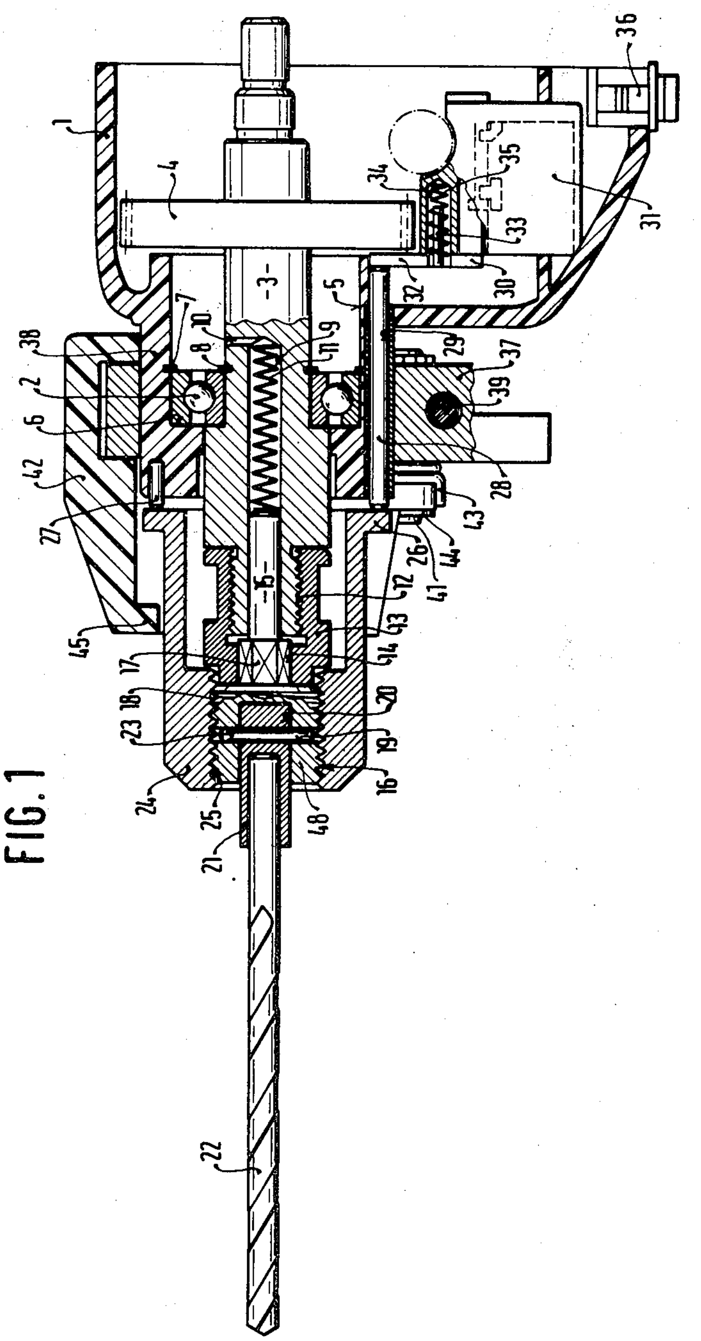
FIG. 1 is an axial sectional view through a tool machine with a tool support according to the invention.

Referring to the drawings, and particularly to FIG. 1, a housing or front cap 1 of a drilling machine is illustrated. The part of the hand-operated machine at the right side of the cap 1 is not shown herein. The front cap 1 surrounds a drive spindle 3 carrying a pinion 4 at one end thereof and supported within a ball bearing 2. The ball bearing is mounted in a bore 5 provided in the front cap 1 and is axially secured in the cap from a slidable movement in a section 6 of the bore 5 by means of the corresponding step made in the spindle 3 at one side of the bearing, and by means of keys 7 and 8 arranged at the other side of the bearing. The drive spindle 3 is formed with an internal axial bore 9 which is vented by a radial opening 10 formed at the end thereof. A helical spring 11 is inserted into the bore 9. The drive spindle 3 has a threaded end portion 12 which is normally adapted to receive a tool chuck. In the embodiment presented herein, an adapter 13 is threadedly mounted on the end portion 12 of the spindle 3. A drill 22 or any other suitable tool is rigidly mounted in a tool shaft 21 which in turn is inserted into a recess 20 formed in a tool-receiving sleeve or trunnion 16. The tool-receiving sleeve 16 is formed with a specially shaped intermediate portion 17 which is engaged in a prismatic half of a nut portion 14 in of the adapter 13.

One end portion of the tool-receiving sleeve 16 is formed as a head 48 having an outer thread 18. A radially extending bore 19 also passes through the tool shaft 21 and head 48. A cylindrical pin 23 is inserted into the bore 19 to interconnect the sleeve 16 with the tool shaft 21 and to prevent their rotation one relative to the other. An outer sleeve 24 is threadably mounted on the thread 18 of the sleeve 16 by means of an inner thread 25 provided in the sleeve 24.

Figure 2:
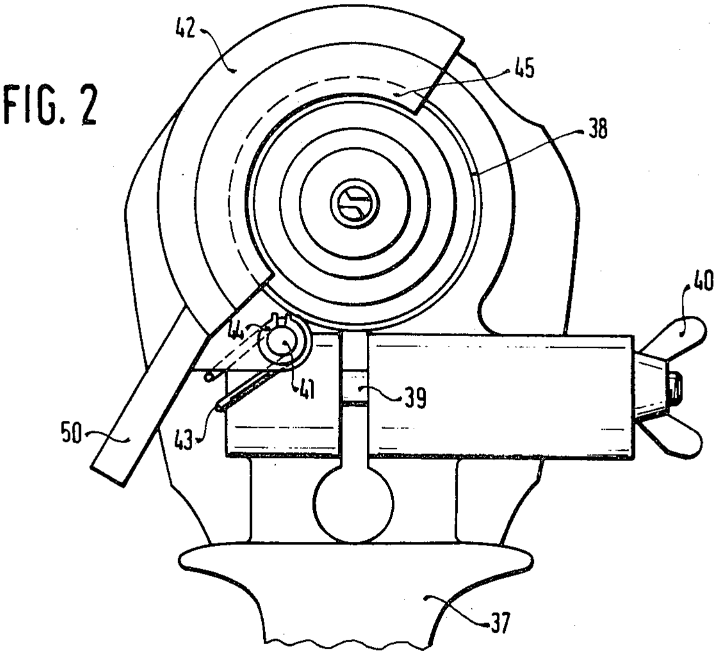
FIG. 2 is a front view of the tool machine, with a portion removed, illustrated in FIG. 1.
Figure 3:
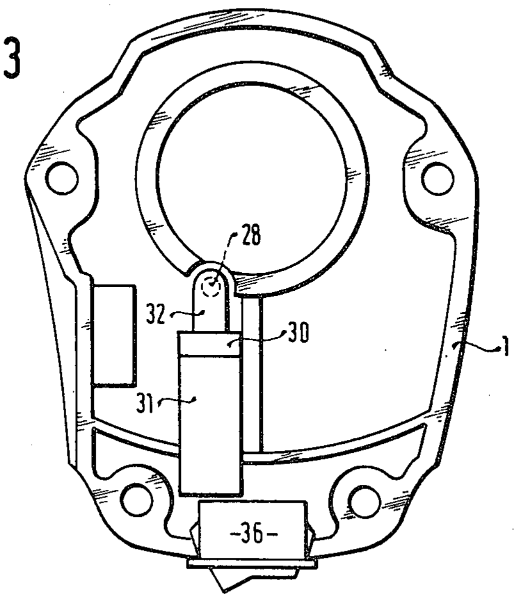
FIG. 3 is a rear view of the tool machine with a tool drive not illustrated.

The thread 25 extends somewhat longer in the lengthwise direction than the length of head 48 of the tool-receiving sleeve 16 as is clearly seen in FIG. 1. The outer sleeve 24 extends in the axial direction so as to overlap adapter 13 and further extends towards the spindle 3 in order to protect the adapter 13 and the internal part of the spindle from contamination. The sleeve 24 is provided with a flange 26 which is formed at one of the ends of the sleeve and is extended outwardly radially from the outer surface of the sleeve. The length of the portion 15 is selected so that the length of coupling engagement between the portion 15 and the spindle 3 is larger than the combined length of contact of the shaped portion 17 with the nut portion 14 and a possible path of the outer sleeve 24. A pin 27 is rigidly mounted in the cap 1 which has a ball-like front surface axially outwardly projected from the end face of the cap. The end face of the flange 26 is arranged at a predetermined distance from the ball-like surface of the pin 27. A longitudinal pin 28 is slidably mounted in the cap 1. The pin 28 is also formed with a ball-like end portion axially outwardly projected from the end face of the cap 1. The end face of the flange 26 bears against the end portion of the longitudinal pin 28 which serves in the arrangement as a transmitter. The pin 28 is guided in an opening 29 formed in the cap 1 and extended parallel to the longitudinal axis of the spindle 3. The pin 28 extends within the interior of the cap 1 and carries at its second end a movable element 30 of a controller 31 which is also shown in FIG. 3. This movable element 30 is adapted to move in the axial direction via the longitudinal pin 28 which is connected to the element 30 by means of a connecting plate 32. As may be clearly seen in FIG. 1, a bearing opening 34 is formed in the cap 1 or in an element rigidly connected to the cap 1 to receive a compression spring 35 and a pin 33 rigidly secured to the element 30. This compression spring 35 constantly tends to slide out from the opening 34 in the direction towards the longitudinal pin 28. The controller 31 is so constructed that it can control loads exerted on the tool drive during the operation in the range from zero to the maximum possible loads. A switch 36 is provided in the arrangement (FIG. 3) to supply an electric current to the tool drive, which switch also serves to supply the current to the controller 31. A gripping handle 37 is mounted on a collar 38 of the cap 1 to which this handle is clamped. A longitudinal bolt 39 with a butterfly nut 40 mounted at the end thereof serves as clamping means to connect the gripping handle 37 to the cap 1 as clearly seen in FIG. 2. The gripping handle 37 is provided with a pin 41 extending parallel to the longitudinal axis of the tool drive. A locking plate 42 encircling the upper portion of the handle 37 is pivotally supported on the pin 41 and may be pivoted about the collar 38 by means of a handle 50. A spring 43 surrounding the pin 41 is arranged between the handle 37 and the locking plate 42. This spring is prestressed so that the locking plate 42 constantly tends to pivot relatively to the collar 38 of the cap 1. A locking ring 44 provided in the assembly ensures the position of the plate 42 and the spring 43 on the pin 41. The locking plate 42 is provided with a radially inwardly projected flange 45. The plate 42 in its turned or pivoted position when it is clamped near the collar 38 and the handle 37 can overlap the sleeve 24. It is to be understood that the flange 45 is placed in the region of axial movement of flange 26 of the outer sleeve 24. Therefore, the pin 27 and the flange 45 in the locking position of the plate 42 limit the maximum axial play of the sleeve 24. After the sleeve 24 has been adjusted on the tool-receiving sleeve 16 this maximum play is more or less utilized. When the axial position of the sleeve 24 is selected relatively to the sleeve 16, in other words when the sleeve 16 is so positioned relatively to the adapter 13, the maximum axial play is not completely taken up before the flange 26 reaches the ball-like surface of the pin 27. This means that the front face of the flange 26 of the sleeve 24 is adjacent the pin 28 communicated with the controller 31 at relatively low speed of rotations of the drive spindle 3.

As was mentioned above, various machine tools such as a drill or any other suitable tools may be preliminarily installed into the tool-receiving sleeve 16 of the outer sleeve 24. The sleeve 24 may be moved into such axial position on the sleeve 16 that a standard number of revolutions may be adjusted by means of the pin 28 when the latter is in contact with the front face of the flange 26. In order to change a tool to be used in the arrangement of the foregoing type the locking plate 42 is pivoted against the action of the spring 43 relatively to the collar 38 of the cap 1. When the flange 45 is moved away from the region of axial movement of the flange 26, the tool 22 with the sleeve 24 may be taken out. When the above mentioned movement of the sleeve 24 to its contacting position with pin 28 begins the helical spring 11 biases the end portion 15 of the sleeve 16. In order to insert a new tool (drill or the like) into the sleeve 16 the locking plate 42 must be placed into the corresponding position. The end guiding portion 15 is installed into the bore 9 of the drive spindle 3 and pressed against the action of the helical spring 11 unless the flange 45 of the plate 42 engages the flange 26 of the sleeve 24. The released locking plate 42 pivots by action of the spring 43 into its locking position. At this time a number of revolutions of the tool drive for the installed tool is limited by the control arrangement in the range from zero to the optimum number. The length of coupling between the nut portion 14 of the adapter 13 and the shaft portion 17 of the tool receiving sleeve 16 is so adjusted that when the controller 31 is set up to zero number of revolutions both elements being coupled become to move out of the engagement. Independently, such adjustment may be obtained when the tool is released from the sleeve 16 before the controller 31 reaches its zero position. This may be attained by means of selection of the respective length of the shaft portion 17 which may be different for each individual tool.

It will be understood that each of the elements described above, or two or more together, may also find a useful application in other types of tool supports differing from the types described above.

While the invention has been illustrated and described as embodied in a tool support, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a tool support for a machine tool, particularly for use in hand tool machines having a tool drive and transmission means adapted to operate under working pressures acting in a direction of an axis of rotation, the combination comprising a housing; a rotary drive spindle having a longitudinal axial recess, an inner tool-receiving sleeve having a first end portion received in said recess, an intermediate shaped portion connected to said first end portion for rotation therewith, and a second end portion adapted to receive a tool; biasing means located within said recess and adapted to bias said first end portion; an outer sleeve mounted on said second end portion and adapted for movement in the axial direction so that its position may be axially adjusted relatively to said spindle; and mounting means connected to said spindle and having an inner shaped surface corresponding to the surface of said shaped portion and adapted to receive said shaped portion for axial movement therethrough so as to engage said shaped portion to provide coupling of said mounting means and said drive spindle with said inner sleeve when said spindle is rotated and to disengage from said shaped portion to uncouple said mounting means from said inner sleeve, said first end portion having such a length that the length of coupling engagement between said first end portion and said spindle is larger than the combined length of contact of said shaped portion with said inner shaped surface and a possible path of said outer sleeve in said axial direction, whereby when the tool is separated from a work piece being machined an uncoupling movement of said shaped portion from said mounting means begins.

2. The support of claim 1, further comprising locking means mounted on said housing and adapted to be selectively positioned in a locking position in which said locking means limit said movement of said outer sleeve or in a releasing position on said housing.

3. The support of claim 2, wherein said biasing means is a compression spring.

4. The support of claim 3, wherein said mounting means include an adapter rigidly connected to said spindle and a nut portion rigidly connected to said adapter and provided with said inner shaped surface.

5. The support of claim 4, wherein said compression spring is prestressed to bias said first end portion towards a tool to be used.

6. The support of claim 5, wherein said outer sleeve is extended in an axial direction towards said end of said drive spindle and adapted for overlapping an open portion of said spindle to thereby prevent the latter from pollution.

7. The support of claim 6, wherein said adapter is threadably mounted on said spindle.

8. The support of claim 7, wherein said second portion of said inner sleeve has an outer thread and said outer sleeve has an inner thread so that said outer sleeve is threadably positioned on said second portion, said outer thread being relatively longer than said inner thread to thereby permit the adjustment of the length of contact of said shaped portion with said inner shaped surface.

9. The support of claim 3, wherein said second end portion is formed with a recess to receive a tool to be used.

* * * * *